(12) United States Patent
Drange et al.

(10) Patent No.: US 11,573,344 B2
(45) Date of Patent: Feb. 7, 2023

(54) REMOVING ELECTROMAGNETIC CROSSTALK NOISE FROM SEISMIC DATA

(71) Applicant: PGS Geophysical AS, Oslo (NO)

(72) Inventors: Geir Andre Motzfeldt Drange, Borgen (NO); Ian David Sorby, Surrey (GB)

(73) Assignee: PGS Geophysical AS, Oslo (NO)

( * ) Notice: Subject to any disclaimer, the term of this patent is extended or adjusted under 35 U.S.C. 154(b) by 346 days.

(21) Appl. No.: 16/711,334

(22) Filed: Dec. 11, 2019

(65) Prior Publication Data

US 2020/0200933 A1 Jun. 25, 2020

Related U.S. Application Data

(60) Provisional application No. 62/782,229, filed on Dec. 19, 2018.

(51) Int. Cl.
*G01V 1/38* (2006.01)
*G01V 1/30* (2006.01)
*G01V 1/28* (2006.01)
*G06F 17/18* (2006.01)
*G01V 1/22* (2006.01)

(52) U.S. Cl.
CPC ............ *G01V 1/3808* (2013.01); *G01V 1/223* (2013.01); *G01V 1/282* (2013.01); *G01V 1/307* (2013.01); *G06F 17/18* (2013.01); *G01V 2210/32* (2013.01); *G01V 2210/48* (2013.01)

(58) Field of Classification Search
CPC ........ G01V 1/162; G01V 1/223; G01V 1/282; G01V 1/307; G01V 1/36; G01V 1/3808; G01V 2200/14; G01V 2210/1293; G01V 2210/1423; G01V 2210/32; G01V 2210/34; G01V 2210/48; G06F 17/18
USPC ............................................................ 702/14
See application file for complete search history.

(56) References Cited

U.S. PATENT DOCUMENTS

| | | | |
|---|---|---|---|
| 4,179,204 A * | 12/1979 | Robinson | G03B 15/03 396/4 |
| 5,448,531 A | 9/1995 | Dragoset, Jr. | |
| 5,511,008 A | 4/1996 | Flament et al. | |
| 5,572,483 A | 11/1996 | Chambers et al. | |
| 6,446,008 B1 | 9/2002 | Ozbek | |

(Continued)

FOREIGN PATENT DOCUMENTS

| | | | |
|---|---|---|---|
| CN | 106154330 A | 11/2016 | |
| CN | 106154330 * | 2/2018 | G01V 1/36 |

(Continued)

OTHER PUBLICATIONS

English translation of CN-106154330-A, Date published : Nov. 23, 2016 (Year: 2016).*

(Continued)

*Primary Examiner* — John H Le

(57) ABSTRACT

One or more first sensors may be configured to sense seismic signals and one or more second sensors may be configured to sense electromagnetic crosstalk signals. The second sensors are not responsive to the seismic signals. The data from the first and second sensors may be recorded as first data and second data, respectively. The first data may be modified based on the second data to remove the electromagnetic crosstalk noise form the seismic data.

17 Claims, 14 Drawing Sheets

(56) References Cited

U.S. PATENT DOCUMENTS

| | | | | |
|---|---|---|---|---|
| 7,295,190 B2* | 11/2007 | Philipp | ............ | H03K 17/9622 |
| | | | | 345/173 |
| 7,411,863 B2* | 8/2008 | Toennessen | ........ | H01M 8/1004 |
| | | | | 367/20 |
| 8,509,028 B2 | 8/2013 | Neelamani et al. | | |
| 9,348,050 B2 | 5/2016 | Krohn | | |
| 9,494,702 B2 | 11/2016 | Poole | | |
| 2004/0000911 A1 | 1/2004 | Morys | | |
| 2010/0302900 A1* | 12/2010 | Tenghamn | ............... | G01V 1/38 |
| | | | | 367/20 |
| 2014/0084927 A1 | 3/2014 | Walsh et al. | | |

FOREIGN PATENT DOCUMENTS

| | | |
|---|---|---|
| CN | 106154330 B | 2/2018 |
| EP | 1089092 | 4/2001 |
| GB | 2337591 A | 11/1999 |

OTHER PUBLICATIONS

CN106154330B, "a Method for Suppressing Parallel Seismic Source Crosstalk Noises Through Electromagnetic Controllable Seismic Source Parabolic Radon Transform", published Feb. 16, 2018, Jiang et al., United State Patent and Trademark Office Translations Service Center, Human translation. (Year: 2018).*

International Search Report and Written Opinion in Appl. No. PCT/EP2019/086226 dated Apr. 7, 2020, 16 pages.

* cited by examiner

REMOVING ELECTROMAGNETIC CROSSTALK NOISE FROM SEISMIC DATA

CROSS REFERENCE TO RELATED APPLICATIONS

This application claims benefit of priority to U.S. Provisional Patent Application Ser. No. 62/782,229, filed on Dec. 19, 2018, which application is hereby incorporated by reference as if entirely set forth herein. To the extent that any material expressly set forth herein conflicts with material incorporated from the provisional application, the material expressly set forth herein controls.

BACKGROUND

Geophysical surveys are used to investigate geological features under the surface of the Earth. For example, seismic surveys can be conducted acoustically, using one or more acoustic sources to transmit acoustic energy into the earth. The acoustic energy is reflected from boundaries of geological features in the Earth that have different acoustic impedances. Sensors can be used to detect the reflected acoustic energy, and a recording system coupled to the sensors can record data representing the detected acoustic energy. The data can be processed to identify potential subsurface structures. For example, the identified structures can aid in the location of hydrocarbons. Electromagnetic surveying can also be used in geophysical surveys. Electromagnetic surveys include imparting electromagnetic energy from an electromagnetic source and detecting the reflected electromagnetic energy with electromagnetic sensors.

Geophysical surveys include land-based surveys and marine surveys. The land-based surveys may include one or more explosive charges or vibrating devices as acoustic sources, or one or more electromagnetic sources, and various sensors located at known distances from the source(s). Marine surveys typically include an acoustic source such as air cannons or marine vibrators towed by a vessel, and/or an electromagnetic source towed by a vessel. The sensors can be towed by the vessel as well, for example in one or more towed streamers. Alternatively, or additionally, the sensors can be included in one or more cables or nodes that are anchored to the sea bottom or seabed.

The seismic sensors typically convert detected acoustic energy to electrical signals, and are subject to electromagnetic crosstalk noise. The noise is captured in the data from the sensors, and pollutes the signals indicating the detected acoustic energy. For example, switching equipment on and off during the survey can create noise on the power lines that supply the sensors and/or related electronics. In a marine environment, the intrusion of water into the enclosure that houses the electronics can create noise on the power lines, for example by creating intermittent low resistivity paths between the power lines. If both seismic surveying and electromagnetic surveying are performed at the same time, the electromagnetic source may impart electromagnetic noise in the seismic data as well. Traditionally, when crosstalk noise is detected during a geophysical survey, the survey is stopped until the problem can be corrected and the survey is restarted. Stopping and restarting the survey increases the expense of conducting the survey.

BRIEF DESCRIPTION OF THE DRAWINGS

The following detailed description makes reference to the accompanying drawings, which are now briefly described.

Figure 1:
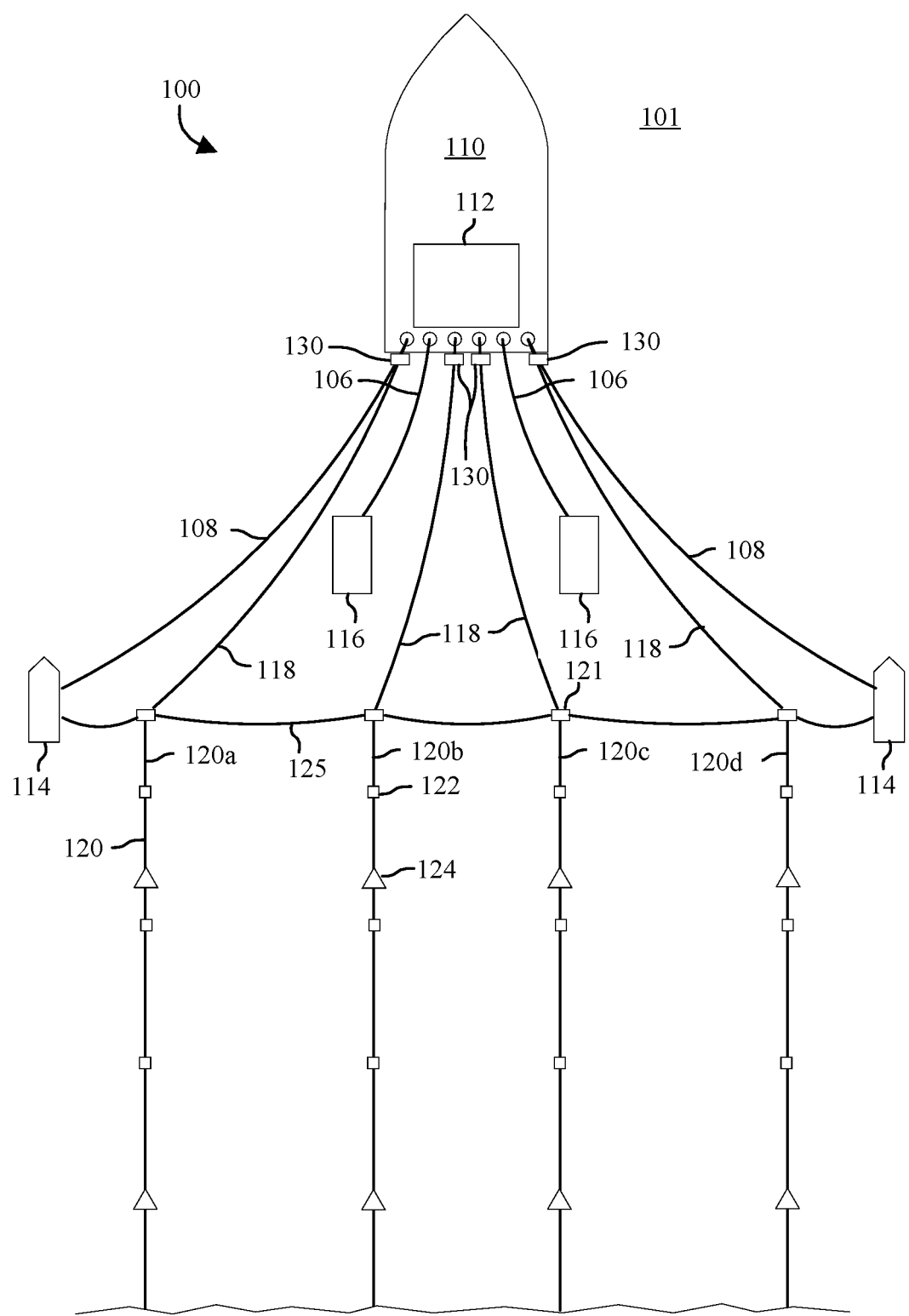
FIG. 1 illustrates a marine seismic survey system including crosstalk recording devices (crosstalk recorders) according to one embodiment of the disclosure.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit, a mechanical device, etc.). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

DETAILED DESCRIPTION OF EMBODIMENTS

In general, geophysical surveying may be used for a variety of purposes. For example, in the oil and gas exploration industry, geophysical surveying is commonly used in the search for subterranean formations. Geophysical surveying techniques yield knowledge of the subsurface structure of the Earth, which is useful for finding and extracting hydrocarbon deposits such as oil and natural gas. Seismic surveying and electromagnetic surveying are two of the well-known techniques of geophysical surveying.

As mentioned above, the occurrence of electromagnetic noise in the seismic survey data pollutes the seismic survey data. In this disclosure, one or more crosstalk recorders may be used to detect the electromagnetic noise. The sensors in the crosstalk recorders may be sensitive to electromagnetic signals, but insensitive to the acoustic signals generated by the seismic sources and the reflected acoustic signals detected by the seismic sensors. Accordingly, the crosstalk sensors may detect and record the electromagnetic noise. The recorded noise may be removed from the seismic samples, substantially eliminating the electromagnetic noise and providing a more accurate representation of the seismic reflections.

The following description uses a marine geophysical survey system as an example. However, the teachings herein regarding the detection, recording, and removal of electromagnetic noise applies to land-based geophysical surveys as well. As such, the discussion related to detecting and removing electromagnetic noise is not limited to marine surveys, but also may be used in land-based surveys.

In a seismic survey conducted in a marine environment (which may include saltwater, freshwater, and/or brackish water environments), one or more seismic signal sources are typically configured to be submerged and towed by a vessel, such as a survey vessel or a source vessel. The survey vessel is typically also configured to tow one or more (typically a plurality of) laterally-spaced streamers through the water. In a typical seismic survey, a vessel may tow a seismic signal source (e.g., an air gun or a marine vibrator) and a plurality of streamers along which a number of seismic sensors (e.g., hydrophones and/or geophones) are located. In some instances, seismic sensors may be secured at or near the bottom of the body of water, such as in ocean bottom cables or nodes. Acoustic waves generated by the seismic signal source may be transmitted to the Earth's crust and then, after interacting with the subsurface formation, may captured at the seismic sensors.

Likewise, electromagnetic surveys may tow equipment, including electromagnetic signal sources and streamers, in a similar fashion. For example, an electromagnetic transmitter (also referred to as an electromagnetic signal source or as an antenna) may be used to generate electromagnetic signals that are propagated into the subterranean structure, interact with subterranean elements, and then may be received by electromagnetic receivers (also referred to as electromagnetic sensors) on the streamers (and/or at or near the bottom of the body of water). Data collected during a marine geophysical survey may be analyzed to locate hydrocarbon-bearing geological structures, and thus determine where deposits of oil and natural gas may be located. Some techniques of marine geophysical surveying involve the simultaneous use of seismic and electromagnetic survey equipment In a typical marine seismic survey, a seismic source such as a marine vibrator or an air gun is commonly used. For example, a plurality of air guns of different sizes may typically be included in an air gun array towable behind a survey vessel or another vessel. The air gun array is generally suspended by chains of selected length from a buoy, float or similar flotation device. In a typical air gun array, an individual air gun includes two electrical leads connected to a solenoid valve for firing the air gun. In addition, the air gun typically includes a high-pressure air feedline.

The receivers (or sensors) used in marine surveying may be located within streamers that may be towed behind a moving vessel. According to some embodiments, the vessel may include one or more energy generating sources (e.g., an air gun, a marine vibrator, etc.) and one or more streamers including the sensors. Each streamer may contain one or more sensors that detect (e.g., measure) reflections of energy generated by the source(s), as described above. The sensors of a streamer may extend along a length of the steamer so as to provide a number of sensors collecting data at locations along a first spatial dimension (e.g., along the length of the streamer). Note that streamers may comprise a plurality of interconnected sections, wherein each section includes one or more sensors. The streamer sections may be modular, allowing a single section of a streamer comprising multiple interconnected sections to be replaced. Each streamer section may range from approximately 50 to 100 meters in length, although other lengths are contemplated. Streamers may vary in length, for example according to the requirements of the survey. Streamers may range from 3 to 12 kilometers in length, although streamers of different lengths (both shorter and longer) do not depart from the scope of the present disclosure. Note that a vessel may tow a plurality of streamers that extend in various geometric arrangements behind the vessel so as to provide an increase in collected data, and/or the quality or characteristics thereof, as compared to a survey that includes a single streamer.

FIG. 1 is a diagram illustrating an example embodiment of a marine geophysical survey system 100. The system 100 includes a survey vessel 110 that may be configured to move along a surface of body of water 101 (e.g., an ocean or a lake) according to various sail paths. In the illustrated embodiment, the survey vessel 110 tows one or more signal sources 116 and one or more streamers 120. As used herein, the term "signal source" or "source element" refers to an apparatus that is configured to emit a signal (e.g., acoustic, electromagnetic, etc.) that may be reflected from one or more underlying structures and then measured. As used herein, the term "streamer" refers to an apparatus that may be towed behind a vessel to detect such signals, and thus may include detectors, sensors, receivers, and/or other structures configured to measure the reflected signal (e.g., by using hydrophones, geophones, electrodes, etc. positioned along or within the streamer).

One or more crosstalk recorders 130 may be coupled to the streamers 120 and may be configured to record electromagnetic crosstalk noise in the streamers 120. In the embodiment of FIG. 1, the crosstalk recorders 130 may be coupled to the streamers 120 near the survey vessel 110. More particularly, the crosstalk recorders 130 may be on board the survey vessel 110 in some implementations. Crosstalk noise may appear at effectively the same time at any point along the streamer 120, and thus the location of the crosstalk recorders 130 along the streamer 120 may not be critical to correctly sampling the electromagnetic crosstalk. In another example, the crosstalk recorders 130 (e.g. one or more crosstalk noise sensors) may be placed at or near an end of each streamer 120 that is nearest the survey vessel 110. In yet another example, the crosstalk recorders 130 may replace one or more of the sensors 122 along the streamer 120.

The signal sources 116 are shown in FIG. 1 being towed by the survey vessel 110 using source cables 106. Each of the signal sources 116 may include sub-arrays of multiple individual signal sources. For example, the signal source 116 may include a plurality of air guns, marine vibrators, and/or electromagnetic signal sources.

The streamers 120 are shown truncated at the bottom of FIG. 1. The streamers 120 may include sensors 122. The sensors 122 may include any type of geophysical sensors, including, for example: pressure sensors such as, e.g., hydrophones; particle motion sensors such as, e.g., geophones and/or accelerometers, which may respectively measure velocity and acceleration; or electromagnetic sensors, as well as any suitable combination of these or other types of sensors. The streamers 120 may further include streamer steering devices 124 (also referred to as "birds") which may provide controlled lateral and/or vertical forces to the streamers 120 as they are towed through the water, typically based on wings or hydrofoils that provide hydrodynamic lift.

The streamers 120 may further include tail buoys (not shown) at their respective back ends. As illustrated in FIG. 1, the streamers 120 are coupled to the survey vessel 110 via lead-in cables 118 and lead-in cable terminations 121. The lead-in cable terminations 121 may be coupled to or associated with spreader ropes or cables 125 so as to fix the lateral positions of the streamers 120 with respect to each other and with respect to a centerline of the survey vessel 110. The streamers 120a-120d may be fixed in lateral positions with respect to each other in order to form a survey spread to collect geophysical survey data as the survey vessel 110 traverses various sail paths on the surface of the body of water 101. As shown, the system 100 may also include two paravanes 114 coupled to the survey vessel 110 via paravane tow ropes 108. The paravanes 114 are the outermost components in the streamer spread and may be used to provide streamer separation. The lead in cables 118 may include the power and signal connections to the streamers 120, and may be viewed as part of the streamers 120 in an embodiment, along with the lead-in cable terminations 121. Each of the sensors 122, in some embodiments, may be a group of sensors that share a digitizing circuit (e.g. see FIGS. 2 and 3 below).

In various embodiments, a geophysical survey system may include any appropriate number of towed signal sources 116 and the streamers 120. For example, FIG. 1 shows two signal sources 116 and four streamers 120. In other embodiments, however, the survey vessel 110 may tow a single streamer or many more streamers. In some embodiments, for example, the survey vessel 110 may tow eighteen or more streamers. A geophysical survey system with an increased number of the signal sources 116 and the streamers 120, in some embodiments, may allow for more survey data to be collected and/or a wider survey spread to be achieved.

Geodetic position (or "position") of the various elements of the system 100 may be determined using various devices, including navigation equipment such as relative acoustic ranging units and/or global navigation satellite systems (e.g., a global positioning system (GPS)).

The survey vessel 110 may include equipment, shown generally at 112 and for convenience collectively referred to as a "recording system." The recording system 112 may include devices such as a data recording unit (not shown separately) for making a recording (in any suitable format) of signals collected by various geophysical sensors. For example, in various embodiments, the recording system 112 may be configured to record reflected signals received at the sensors 122 while the survey vessel 110 traverses various sail paths on the surface of the body of water 101. The recording system 112 may also include navigation equipment (not shown separately), which may be configured to control, determine, and record, at selected times, the geodetic positions of: the survey vessel 110, the signal sources 116, the streamers 120, the sensors 122, etc. The recording system 112 may also include a communication system for communicating with other vessels, on-shore facilities, etc. The recording system 112 may be configured to record crosstalk noise data from the crosstalk recorders 130 as well. In an embodiment, the recording system 112 may include one or more computing systems (also referred to as "computer systems" or "computers") configured to receive the seismic data and the electromagnetic crosstalk data and to store the data on a computer accessible storage medium.

Figure 2:
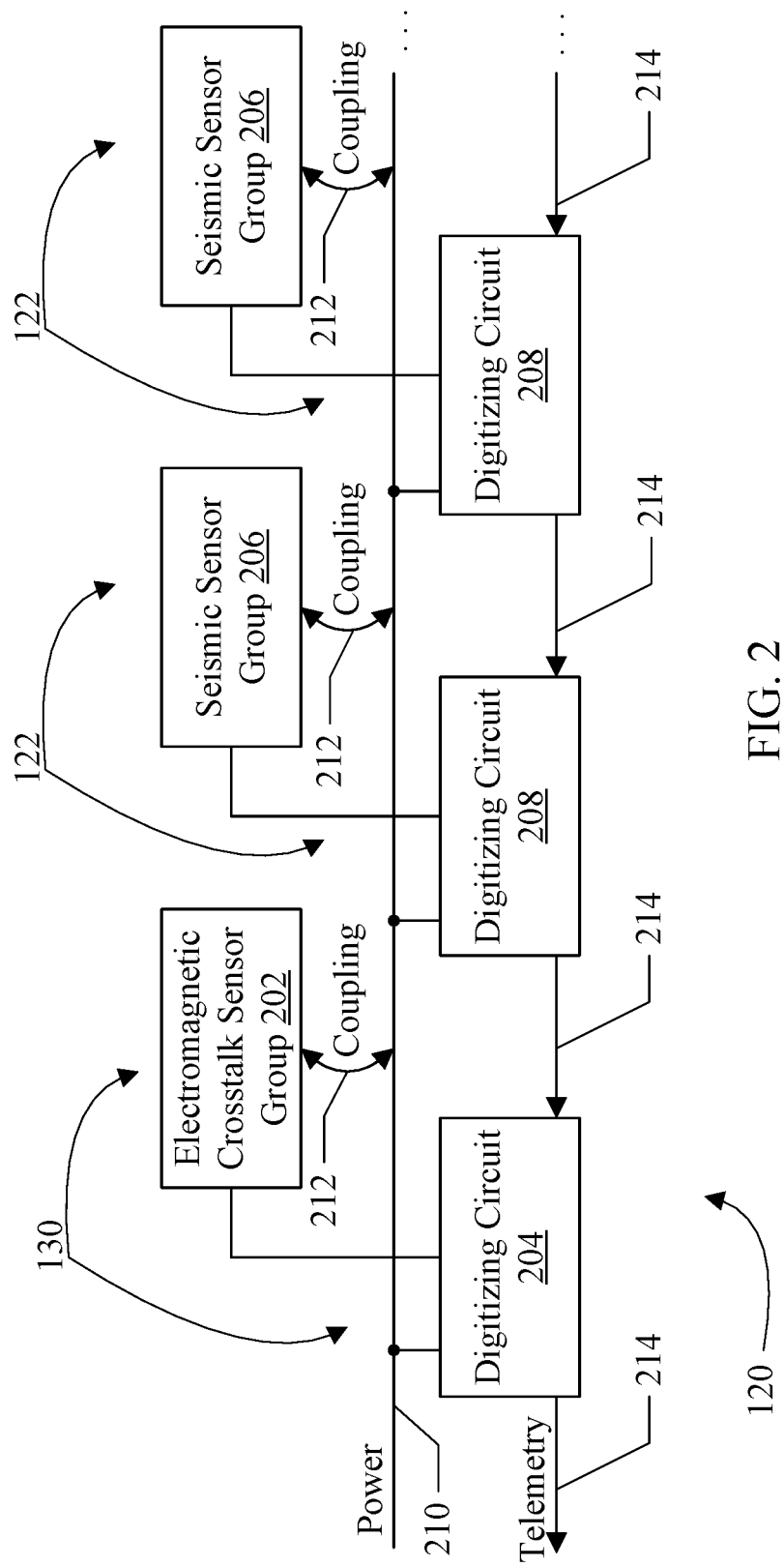
FIG. 2 illustrates one embodiment of a streamer that includes a crosstalk recorder and one or more seismic sensor groups.

FIG. 2 illustrates a portion of one example embodiment of a streamer 120 with a crosstalk recorder 130 and a pair of sensors 122. In the embodiment of FIG. 2, the crosstalk recorder 130 includes an electromagnetic crosstalk sensor group 202 coupled to a digitizing circuit 204. The sensors 122 each include a seismic sensor group 206 coupled to a digitizing circuit 208. One or more power lines 210 supply power to the digitizing circuits 204 and 208. In an embodiment, the electromagnetic crosstalk sensor group 202 and the seismic sensor groups 206 are passive devices that do not require power. In other examples, one or both of the electromagnetic crosstalk sensor group 202 and the seismic sensor group 206 may also be powered and the power lines 210 may be coupled to such sensor groups 202 and/or 206.

The seismic sensors in the seismic sensor group 206 may be configured to detect a seismic signal and output an electrical signal (e.g. a voltage or a current) representing the seismic signal to the digitizing circuit 208. The digitizing circuit 208 may be configured to digitize the electrical signal to a plurality of samples at a specified sample rate and transmit the samples to the survey vessel 110 (and more particularly the recording system 112). The samples may be transmitted on a telemetry interconnect 214 to the recording system 112. The samples may pass through the intervening digitizing circuits 208 and 204. The recording system 112 may include a computer system to record the samples from the seismic sensor group 206.

The seismic sensor groups 206 may be susceptible to electromagnetic crosstalk noise, e.g. from the power lines 210, through capacitive and/or magnetic coupling to the power lines 210 (illustrated as "coupling" 212 in FIG. 2). Because the seismic sensor groups 206 are generating electrical signals, the crosstalk noise may interfere with/change the electrical signals and thus change the sampled data captured by the digitizing circuits 208. The electromagnetic crosstalk sensor group 202 may be susceptible to the same coupling 212, and thus may detect the electromagnetic crosstalk noise and produce an electrical signal that represents the electromagnetic crosstalk noise. However, the electromagnetic crosstalk sensor group 202 may not be responsive to seismic signals. That is, the electromagnetic crosstalk sensor group 202, when in the presence of seismic signals generated by the seismic sources 116 and reflected from the Earth, may not output a perceptible response to the seismic signals. Accordingly, the output of the electromagnetic sensor may reflect the electromagnetic crosstalk induced through the coupling, but may not reflect the seismic signals. In a system in which electromagnetic survey techniques are being used at the same time as seismic techniques, crosstalk related to the reflected electromagnetic signals that couples into the seismic sensor groups 206 may also be detected by the electromagnetic crosstalk sensor group 202, and thus may be detected and removed from the seismic samples as well.

As discussed above, the electromagnetic crosstalk sensor group 202 may be configured to detect the electromagnetic crosstalk noise induced by the coupling 212, and may be configured to output an electrical signal representing the electromagnetic crosstalk noise. The digitizing circuit 204 may sample the signal output by the electromagnetic crosstalk sensor group 202 at a specified sample rate and may transmit the samples to the computer system in the recording system 112 for recording (e.g. over the telemetry interconnect 214). Thus, the recording system 112 may include a computer system to record samples from the crosstalk recorder 130 (and more particularly samples from the electromagnetic crosstalk sensors in the electromagnetic sensor group 202). The sample rate used by the digitizing circuit 204 may be the same as the sample rate used by the digitizing circuits 208, and may be synchronized to the digitizing circuits 208. Thus, the electromagnetic samples may be comparable to the electromagnetic noise in the seismic samples that are captured at the same sample point.

As mentioned above, FIG. 2 may be an illustration of a portion of a marine seismic streamer 120. In other embodiments, a similar construction to that of FIG. 2 may be used for an ocean-bottom cable, or an ocean-bottom node. In these embodiments, the structure is anchored to the ocean bottom or placed on the ocean bottom prior to the start of the survey, and the survey vessel 110 passes over the area in which the cables or nodes are placed. The cables/nodes may record the sensor samples and electromagnetic noise samples locally and temporarily, until the cables/nodes are recovered and the data may be transferred to the recording system 112. In the case of the marine seismic streamer 120, the streamer 120 may include a plurality of sections. Each section may include one or more sensors, and may be connected to other sections to form the streamer 120. A given section may include a crosstalk recorder 130 and one or more seismic sensors 122. Alternatively, one section may include the crosstalk recorder 130 and other sections may include the one or more seismic sensors. Accordingly, the crosstalk recorder 130 and the seismic sensors 122 may be enclosed in any device configured to be deployed in a marine environment. For example, the crosstalk recorder 130 and the seismic sensors 122 may be included in a streamer used to perform a marine seismic survey.

The term "sensor group," as used herein, is defined as a set of two or more sensors (e.g., particle motion sensors, pressure sensors, or electromagnetic sensors) that are connected together such that the outputs of the sensors are combined. For example, the outputs may be combined in an analog fashion. In some embodiments, a sensor group may span a length of 5 meters along a streamer. In some other embodiments, a sensor group may span a length of 10 meters along a streamer. For example, sensors within a group may be connected electrically or optically in some embodiments. In some embodiments, this combined analog output from a sensor group may then be digitized for further processing. Sensors within a group may in various embodiments be connected in serial and/or in parallel. One of ordinary skill in the art with the benefit of this disclosure will understand that there are various ways of connecting the sensor outputs in each group.

Figure 3:
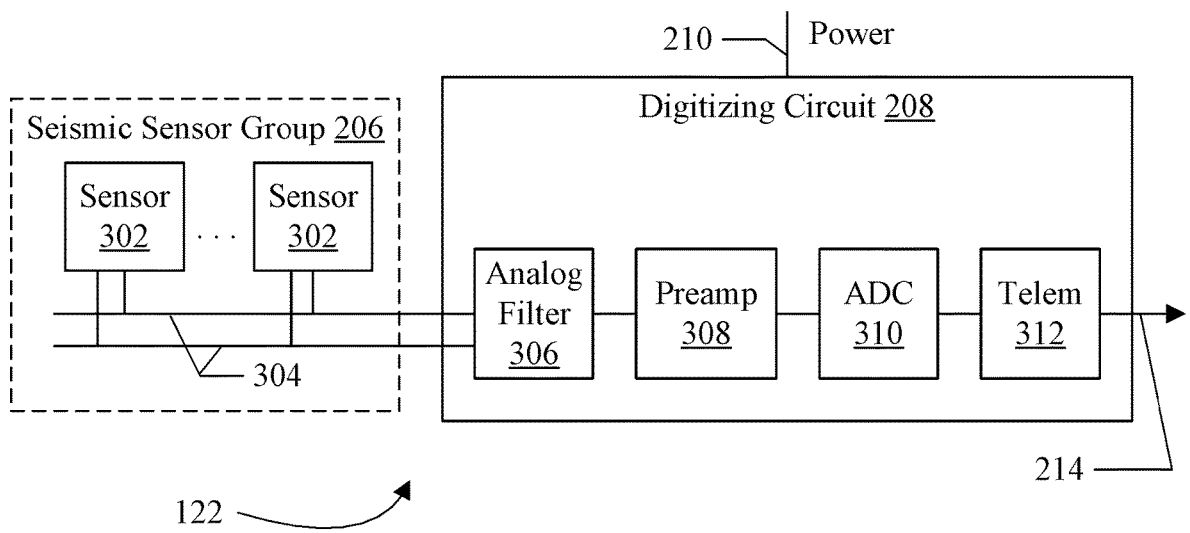
FIG. 3 illustrates one embodiment of seismic sensor group in greater detail.

FIG. 3 illustrates one embodiment of a seismic sensor 122 (including the seismic sensor group 206 and the digitizing circuit 208) in greater detail. In the illustrated embodiment, the seismic sensor group 206 includes a plurality of sensors 302 coupled to a plurality of electrical conductors 304, which are coupled to the digitizing circuit 208. The electrical conductors 304 may be any sort of conductor. For example, the electrical conductors 304 may be a twisted pair of conductors (or wires). A twisted pair tends to reduce the amount of electromagnetic interference that can be induced on the wires (and the amount of electromagnetic noise produced from the wires) as compared to untwisted wiring, for example.

The sensors 302 may include any sort of seismic sensor. For example, the sensors 302 may include pressure sensors such as hydrophones, particle motion sensors such as velocity meters, accelerometers, geophones, pressure gradient sensors, particle displacement sensors, etc., and any other type of seismic sensor or acoustic sensor.

The digitizing circuit 208 may include an analog filter 306 coupled to the conductors 304, a preamplifier 308 coupled to the analog filter 306, an analog to digital converter (ADC) 310 coupled to the preamplifier 308, and a telemetry circuit 312 coupled to the ADC 310 and the telemetry interconnect 214. In particular, the telemetry interconnect 214 may include an input from a downstream digitizing circuit 204/208 and an output to an upstream digitizing circuit 204/208 (or the recording system 112). In this context, downstream may refer to a circuit farther from the vessel 110 and upstream may refer to a circuit closer to the vessel 110 and/or the vessel 110 itself. The telemetry circuit 312 may be configured to receive samples from downstream circuits and to relay them upstream, in addition to transmitting samples from the ADC 310. The analog filter 306 may be configured to filter the electrical signal on the conductors 304 to remove undesired aspects of the signal (e.g. frequencies that are known to be undesired, amplitude modulations, etc.). The preamplifier 308 may be configured to amplify the filter signal to provide better range for sampling, e.g., and the ADC 310 may be configured to sample the signal at a specified sample rate. The digitizing circuit 208 (and more particularly the components thereof such as the analog filter 306, the preamplifier 308, the ADC 310, and/or the telemetry circuit 312) may be coupled to the power line 210.

Figure 4:
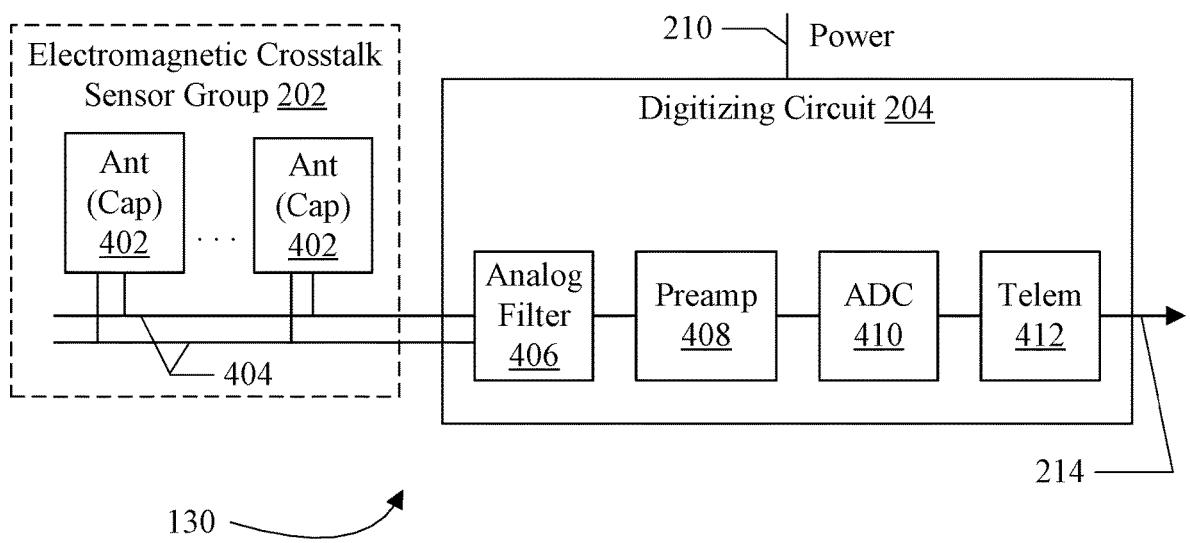
FIG. 4 illustrates one embodiment of a crosstalk recorder in greater detail.

FIG. 4 illustrates one embodiment of a crosstalk recorder 130 (including the electromagnetic crosstalk sensor group 202 and the digitizing circuit 204) in greater detail. In the illustrated embodiment, the electromagnetic crosstalk sensor group 202 includes at least one antenna, and in the illustrated embodiment includes a plurality of antennas 402 coupled to a plurality of electrical conductors 404, which are coupled to the digitizing circuit 204. The electrical conductors 404 may be any sort of conductor. For example, the electrical conductors 304 may be a twisted pair of conductors (or wires). A twisted pair tends to reduce the amount of electromagnetic interference that can be induced on the wires (and the amount of electromagnetic noise produced from the wires) as compared to untwisted wiring, for example.

More particularly, the plurality of conductors 404 may have a length that is matched to the length of the plurality of conductors 304 in the seismic sensor group 206 shown in FIG. 3. Thus, the response of the conductors 404 to electromagnetic crosstalk noise may be matched to the response of the conductors 304.

Any type of antenna 402 may be used in various embodiments. Generally, an antenna is any structure that is capable of receiving electromagnetic energy. The antenna may receive the energy wirelessly, e.g. through the coupling discussed above. The antenna may receive the energy through electrical conduction, e.g. from the power line 210 through the digitizing circuit 204 to the electromagnetic crosstalk sensor group 202. Viewed in another way, an antenna is any structure that is capable of detecting electromagnetic signals. For example, the antennas 402 may comprise capacitors as shown in FIG. 4, and more particularly may comprise cylindrical capacitors in which an inner electrode is surrounded by a dielectric, which is further surrounded by an outer electrode. Each electrode is coupled to one of the twisted pair 404. The electrodes may be formed from any type of metal that is not responsive to acoustic/seismic energy. Other types of antennas may be used in other embodiments. For example, hydrophones are often formed as a pair of metal plates separated by a piezoelectric crystal. An antenna may be formed by removing the piezoelectric crystal and inserting a material having the same dielectric constant as the crystal (or constructing a capacitor having plates of the same size as the hydrophone and a dielectric material that matches the crystal). An antenna formed similar to the hydrophone may closely approximate the electromagnetic response of the hydrophone, and thus may be a good match to a hydrophone sensor. Accordingly, an example electromagnetic sensor group 202 that closely approximates the response of the seismic sensor group 206 to electromagnetic crosstalk noise may include capacitors that are formed similar to hydrophones and that are coupled to twisted pair wires matched to the length of wires used in the sensor group 206. Since there are no acoustic or seismic-sensitive materials in the electromagnetic sensor group 202, the electromagnetic sensor group 202 may be non-responsive to the acoustic/seismic energy. Thus, the response of the electromagnetic sensor group 202 may isolate the electromagnetic crosstalk noise that may occur during the survey.

The digitizing circuit 204 may include an analog filter 406 coupled to the conductors 404 (and thus to the antennas 402), a preamplifier 408 coupled to the analog filter 406, an analog to digital converter (ADC) 410 coupled to the preamplifier 408, and a telemetry circuit 412 coupled to the ADC 410 and the telemetry interconnect 214 to transmit the sampled electromagnetic signals to a computer in the recording system 112. In particular, the telemetry interconnect 214 may include an input from a downstream digitizing circuit 204/208 and an output to an upstream digitizing circuit 204/208 (or the recording system 112). The telemetry circuit 412 may be configured to receive samples from downstream circuits and to relay them upstream, in addition to transmitting samples from the ADC 410. The analog filter 406 may be configured to filter the electrical signal on the conductors 404 to remove undesired aspects of the signal (e.g. frequencies that are known to be undesired, amplitude modulations, etc.). The preamplifier 408 may be configured to amplify the filter signal to provide better range for sampling, for example, and the ADC 410 may be configured to sample the signal at a specified sample rate. Thus, the ADC 410 may be configured to sample the one or more antennas 402 at the specified sample rate. The digitizing circuit 204 (and more particularly the components thereof such as the analog filter 406, the preamplifier 408, the ADC 410, and/or the telemetry circuit 412) may be coupled to the power line 210. In an embodiment, the analog filter 406 and the preamp 408 may be optimized for operation with the antennas (e.g. capacitor 402), whereas the ADC 410 and the telemetry circuit 412 may be the same as the ADC 310 and the telemetry circuit 312.

More particularly, the ADC 410 and the telemetry circuit 412 may be configured to implement the same sample rate as the ADC 310 and the telemetry circuit 312. Viewed in another way, the ADC 410 may match the sample rate of the ADC 310. Thus, the digitizing circuit 204 may be coupled to the one or more antennas in the electromagnetic crosstalk sensor group 202 and may be configured to digitize the electromagnetic signals at a sample rate that matches a sample rate of one or more seismic sensors that detect seismic signals, wherein the one or more seismic sensors are susceptible to interference by the electromagnetic signals.

In an embodiment, the sensors in the electromagnetic crosstalk sensor group 202 may be designed to have substantially the same response to electromagnetic crosstalk noise as the seismic sensor group 206. The response is substantially the same if the magnitude of the voltage and/or current produced by the electromagnetic crosstalk sensor group to the electromagnetic crosstalk signal is within at least 10% of the magnitude of the voltage and/or current produced by the seismic sensor group 206 to the electromagnetic crosstalk noise. Larger or smaller percentages may be used in other implementations, or an absolute difference may be used (e.g. within 5 volts of magnitude for a voltage, although larger or smaller differences may be used). The response may be substantially the same if the magnitudes are within the above range even if the phase differs. Accordingly, the electromagnetic crosstalk noise detected at a given time by the electromagnetic crosstalk sensor group 202 may be comparable to the electromagnetic crosstalk noise in the seismic signals from the seismic sensor group, which may ease the use of the electromagnetic crosstalk data to remove the electromagnetic crosstalk noise from the seismic data. For example, the matching of the lengths of the twisted pairs 304 and 404, and the matching of the antennas 402 to the electromagnetic response of the sensors 302, may cause the response to be substantially the same. Variations in manufacturing of components, imperfect matching of response, etc. may lead to some difference between the response of the electromagnetic crosstalk sensor group 202 and the seismic sensor group 206, but the response of the electromagnetic crosstalk sensor group 202 to the electromagnetic crosstalk noise may closely approximate the response of the seismic sensor group 206 to the electromagnetic crosstalk noise. In some embodiments, compensation for the differences may be applied by modifying one or more samples of the crosstalk recorder 310 and/or the seismic sensors 122. It is noted that the differences in response themselves may not be critical, as long as the differences are known or can be calculated or otherwise determined. Known differences can be compensated for, before applying the detected crosstalk noise to the seismic data, or when applying the detected crosstalk noise to the seismic data.

More particularly, in one embodiment, a streamer section including one or more of the sensors 122 may be placed in a sound-controlled laboratory, so that the sensors 122 are not receiving acoustic/seismic excitation. The section may be exposed to electromagnetic noise, e.g. injected onto the power lines 210, and the response of the sensors 122 may be measured. The electromagnetic crosstalk sensor group 202 and the digitizing circuit 204 may be designed to mimic the response of the sensors 122 to the electromagnetic noise as measured in the laboratory.

In an embodiment, one or more electromagnetic crosstalk sensors are an example of a means for detecting electromagnetic crosstalk noise (e.g. an electromagnetic crosstalk sensor group). The one or more electromagnetic sensors may be one or more antennas, for example, such as capacitors. The capacitors may be cylindrical capacitors, in an embodiment. In another implementation, the capacitors may be formed from electrodes matched to a hydrophone, with a dielectric material that matches the dielectric constant of the piezoelectric crystal in the hydrophone. Any other embodiment of a crosstalk recorder may be an example of a means for detecting electromagnetic crosstalk noise. One or more seismic sensors are an example of a means for detecting seismic signals, where the means is susceptible to electromagnetic crosstalk noise. The seismic sensors may be any type of sensor that is sensitive to seismic signals (acoustic, pressure, particle motion, etc., including the various examples set forth herein of pressure sensors and particle motion sensors). The seismic sensors may be included in a seismic sensor group, for example. The digitizing circuits 202 and 208 are examples of a means for digitizing the electromagnetic crosstalk noise and the seismic signals, respectively.

Figure 5:
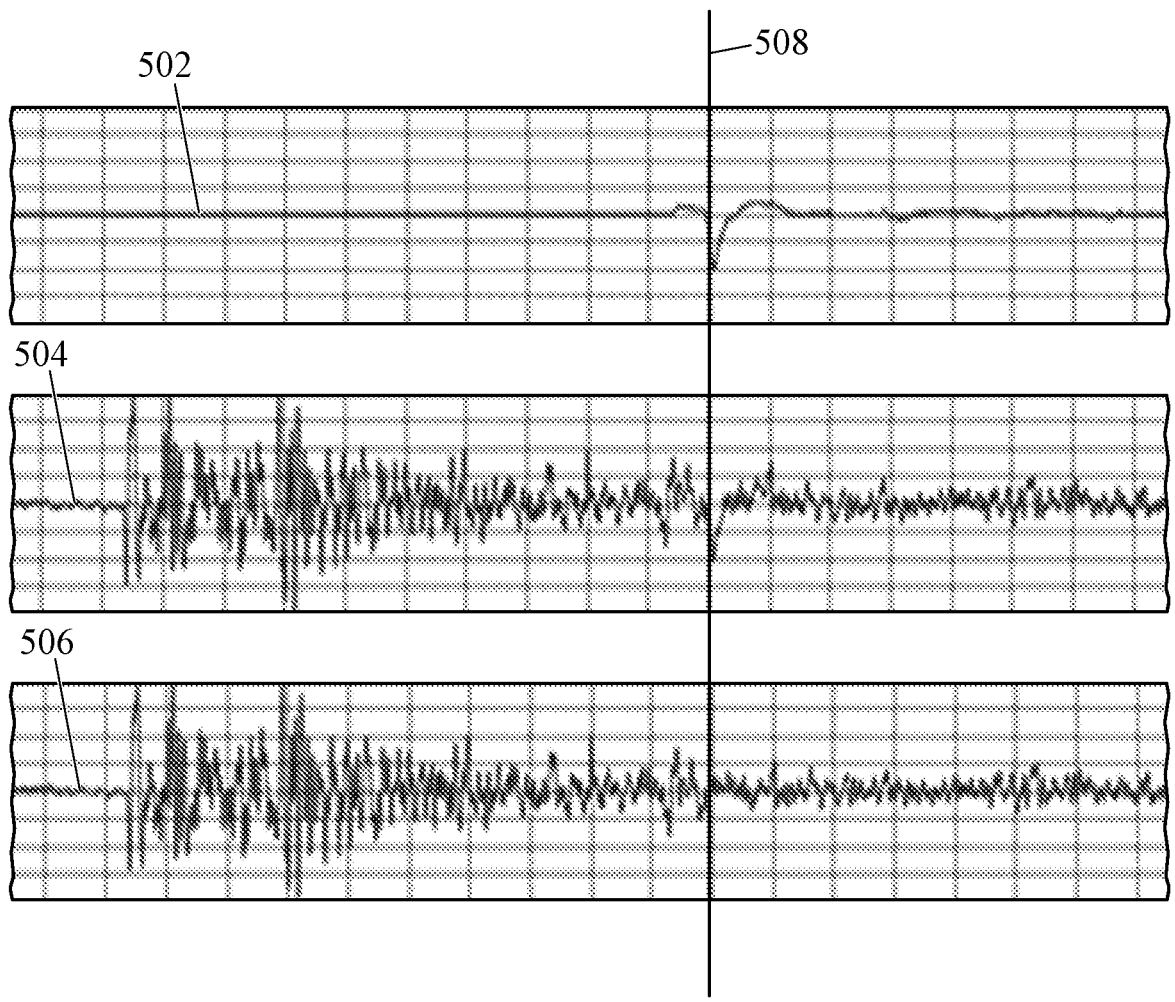
FIG. 5 is a timing diagram illustrating an output of one embodiment of the crosstalk recorder, an output of one embodiment of one or more seismic sensor groups, and a processed output of the one or more seismic sensor groups that has the output of the crosstalk recorder removed.

Turning next to FIG. 5, a timing diagram illustrating an output 502 of one embodiment of the crosstalk recorder 130, an output 504 of a sensor 122, and a modified output 506 of the sensor 122 is shown. The vertical line 508 in FIG. 5 illustrates an electromagnetic crosstalk event, in this case a negative pulse followed by an overshooting positive pulse of smaller magnitude. In the output 504, the electromagnetic crosstalk noise has interfered with the seismic samples. After the electromagnetic crosstalk noise is removed, the output 506 is a more accurate capture of the seismic signals occurring during the survey. For example, the output 502 may be subtracted from the output 504 to generate the output 506. Since the sample rate is the same, in an embodiment, and the crosstalk recorder 130 is synchronized to a high degree of accuracy to the seismic sensors 122, the subtraction may occur by subtracting each sample captured by the crosstalk recorder 130 from the corresponding sample captured by each seismic sensor 122. If there is a mismatch in response, or other differences between the captured samples, the samples from the crosstalk recorder 130 and/or the seismic sensors 122 may be modified before the subtraction and/or as part of the subtraction.

Figure 6:
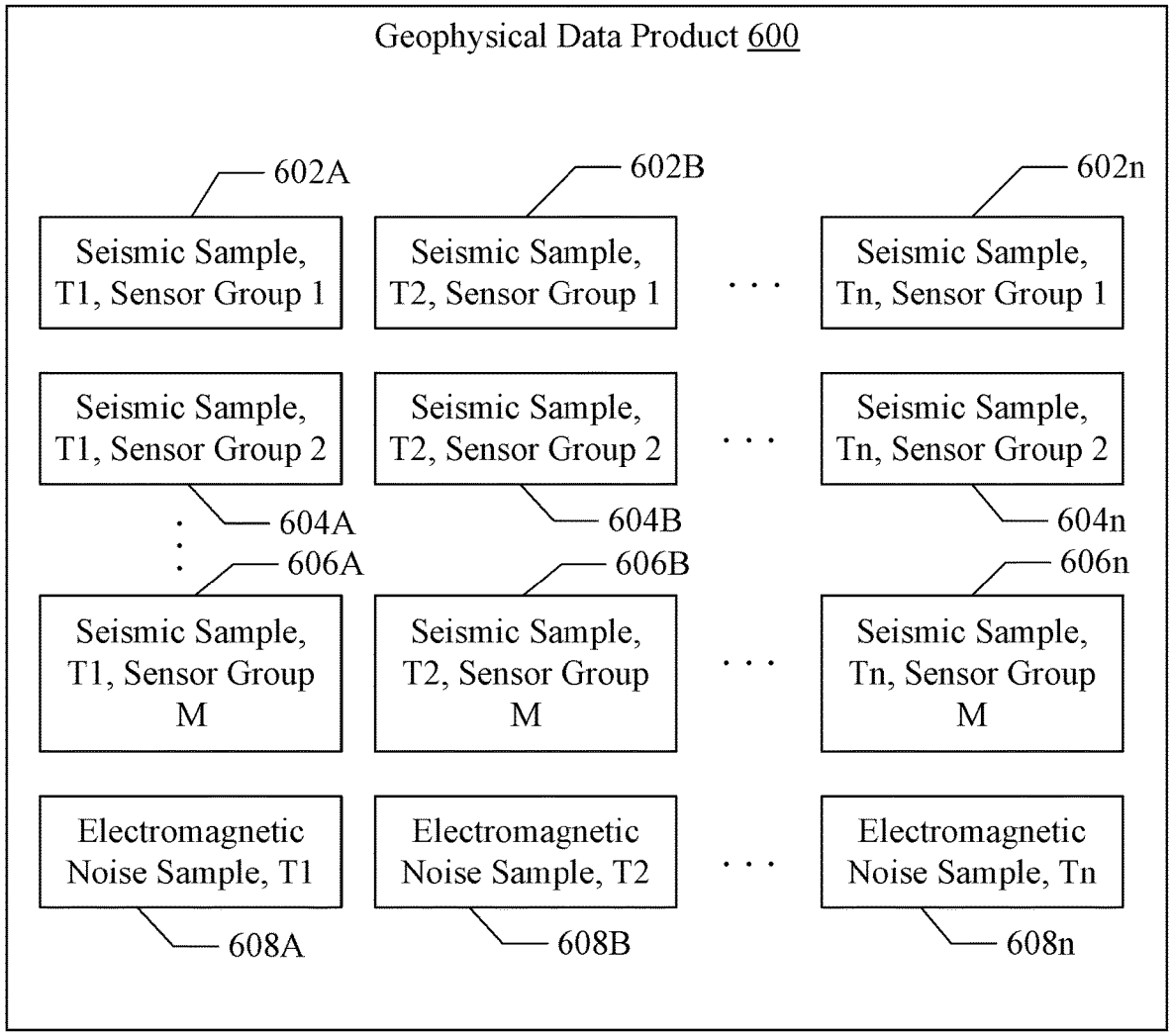
FIG. 6 illustrates one embodiment of a geophysical data product according to some embodiments.

FIG. 6 illustrates an example geophysical data product 600 according to some embodiments. A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized and/or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured subsequent to survey completion, e.g., during the course of analysis of the survey.

In the illustration of FIG. 6, the geophysical data product 600 may include samples from each seismic sensor group. For example, the samples from a first seismic sensor group corresponding to sample times T1 through Tn are illustrated at reference numerals 602A-602n. Similarly, samples from a second seismic sensor group corresponding to sample times T1 through Tn are illustrated at reference numerals 604A-604n and samples from a third seismic sensor group corresponding to sample times T1 through Tn are illustrated at reference numerals 606A-606n. Corresponding electromagnetic noise samples from the crosstalk recorder 130 for sample times T1 through Tn are illustrated at reference numerals 608A-608n. The physical arrangement of data on the product 600 may differ from that shown in FIG. 6. Viewed in another way, the samples 602A, 604A, 606A, and 608A may correspond to the same point in time (sample time T1). The samples 602B, 604B, 606B, and 608B may correspond to another same point in time (sample time T2), and the samples 602n, 604n, 606n, and 608n may correspond to yet another same point in time (sample time Tn). Other samples, represented by the ellipses in FIG. 6, may correspond to other sensor groups and/or other sample times. Accordingly, the geophysical data product 600 in FIG. 6 may comprise the raw sensor samples in this case. Additionally, the electromagnetic crosstalk noise samples 608A-

608*n* shown in FIG. 6 may correspond to one streamer. That is, the electromagnetic crosstalk samples 608A-608*n* may be samples captured from a corresponding crosstalk recorder coupled to the streamer or included in the streamer. When multiple streamers are used, there may be multiple sets of electromagnetic noise samples corresponding to the different streamers, since different streamers may experience different electromagnetic crosstalk noise. There may also be more than one crosstalk recorder per streamer, with corresponding samples, in other embodiments.

Figure 7:
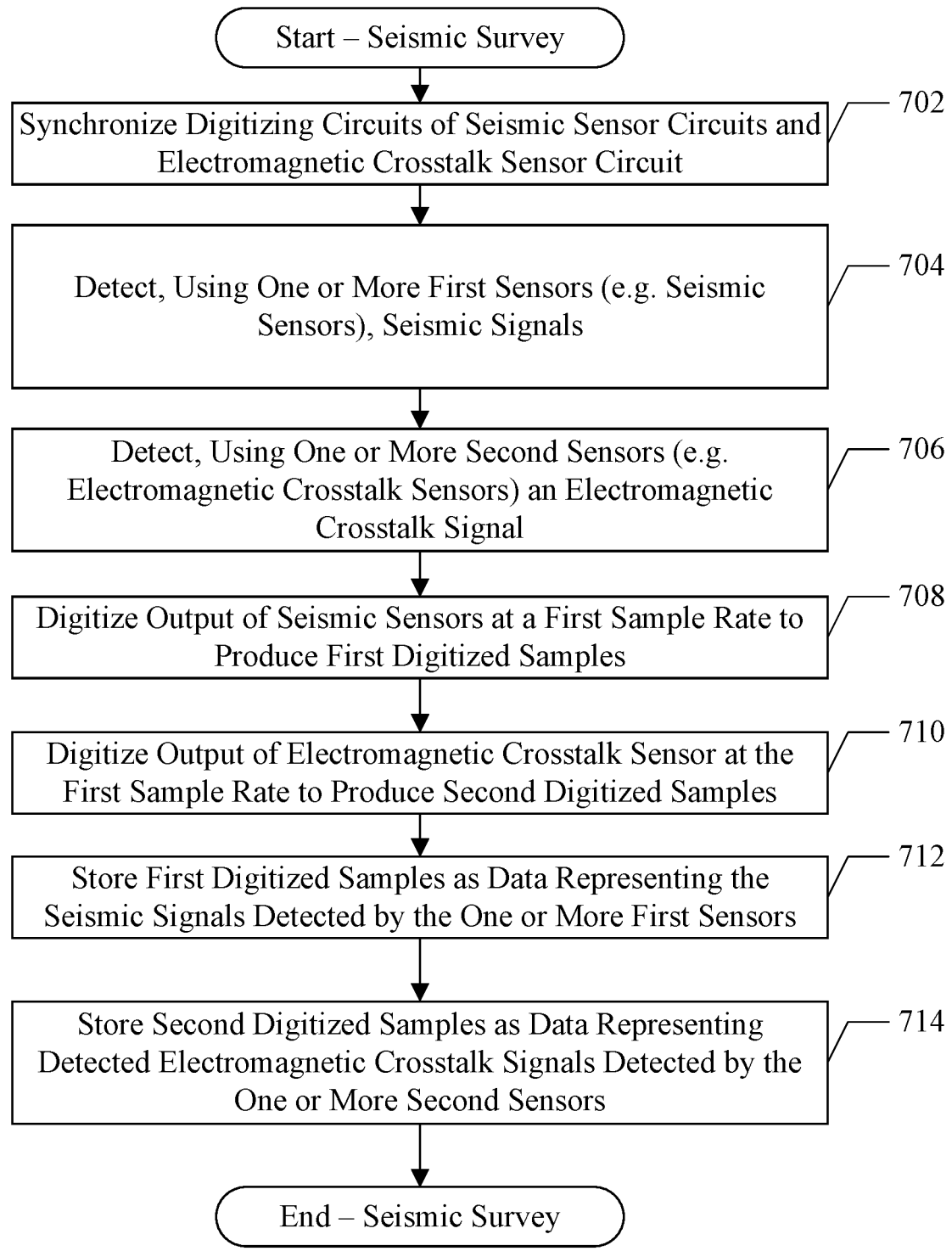
FIG. 7 illustrates one embodiment of a process for performing a seismic survey.

FIG. 7 illustrates one embodiment of a process for performing a seismic survey. While the blocks are shown in a particular order for ease of understanding, other orders may be used. Blocks may be performed in parallel (e.g. the detecting blocks may be performed in parallel; the digitizing blocks may be performed in parallel; and the storing blocks may be performed in parallel). The synchronizing block may be performed repeatedly during the process. Blocks, combinations of blocks, and/or the process as a whole may be iterated as desired. In an embodiment, the process of FIG. 7 (or at least a portion thereof, such as the storing blocks) may be implemented as a plurality of instructions executed by a computer system.

The process may include synchronizing the digitizing circuits 208 and 204 corresponding to the seismic sensor groups and the electromagnetic crosstalk sensor groups (block 702). Any well-known mechanism for synchronizing the digitizing circuits may be used, typically involving communication between the circuits and a controller located, e.g. on the survey vessel 110. The communication may be performed over the telemetry interconnect 214 and/or over one or more sideband signals, as desired. The synchronization may cause the samples captured by the digitizing circuits to be captured with a high degree of accuracy (e.g. the time at which a given set of corresponding samples are captured may be carefully controlled to be as close as possible to the same time, so that the samples are comparable in time).

The process may include detecting, using one or more first sensors, seismic signals (block 704). The one or more first sensors may be seismic sensors, for example, such as the sensors 302 illustrated in FIG. 3. The sensors may be included in multiple sensor groups 206 that are included in multiple sensors 122 that are distributed across the length of a streamer, for example. Alternatively, or additionally, the sensors may be included in nodes or cables on the sea bottom or seabed. The process may further include detecting, using one or more second sensors, an electromagnetic crosstalk signal (block 706). The second sensors may be electromagnetic crosstalk sensors such as the sensors 402 shown in FIG. 4. The sensors may be included in at least one sensor group 202 that may be part of at least one crosstalk recorder 130. In some embodiments, more than one crosstalk recorder 130 may be used. The one or more second sensors are not responsive to the seismic signals. For example, in the presence of the seismic signals but no electromagnetic noise, the one or more second sensors may not output a perceptible voltage or current. The digitizing circuit may sample a zero during times that no electromagnetic crosstalk noise is present, for example.

The process may further include digitizing the seismic signals (e.g. the output data of the seismic sensors, representing the seismic signals) at a first sample rate, producing first digitized samples (block 708). The process may include digitizing the electromagnetic crosstalk noise signal (e.g. the output data of the electromagnetic crosstalk sensors, representing the electromagnetic crosstalk noise signal) at the first sample rate to produce second digitized samples (block 710). Thus, the seismic signals and the electromagnetic crosstalk signal may be digitized at a same sample rate. Additionally, since the digitizing circuits are synchronized, a set of samples from the seismic sensors and a sample from the electromagnetic crosstalk signal may occur at substantially the same time.

The samples may be transmitted by the digitizing circuits 208 and 204 to the recording system 112 for storage. More particularly, a computer system in the recording system 112 may store the first digitized samples as first data representing the seismic signals (block 712) and may store the second digitized samples as second data representing the electromagnetic crosstalk signal (block 714). The data may represent the samples because there may be some error in the data. Specifically, the electromagnetic crosstalk sensors may have a response to the electromagnetic magnetic noise that does not exactly match the response of the seismic sensors to the electromagnetic crosstalk noise. For example, the response may differ in one or more of phase and amplitude. The differences may be quantified and corrected for when removing the electromagnetic noise from the seismic samples. While the above discussion of FIG. 7 uses a marine seismic survey as an example, land-based seismic surveys may also be similar.

Figure 8:
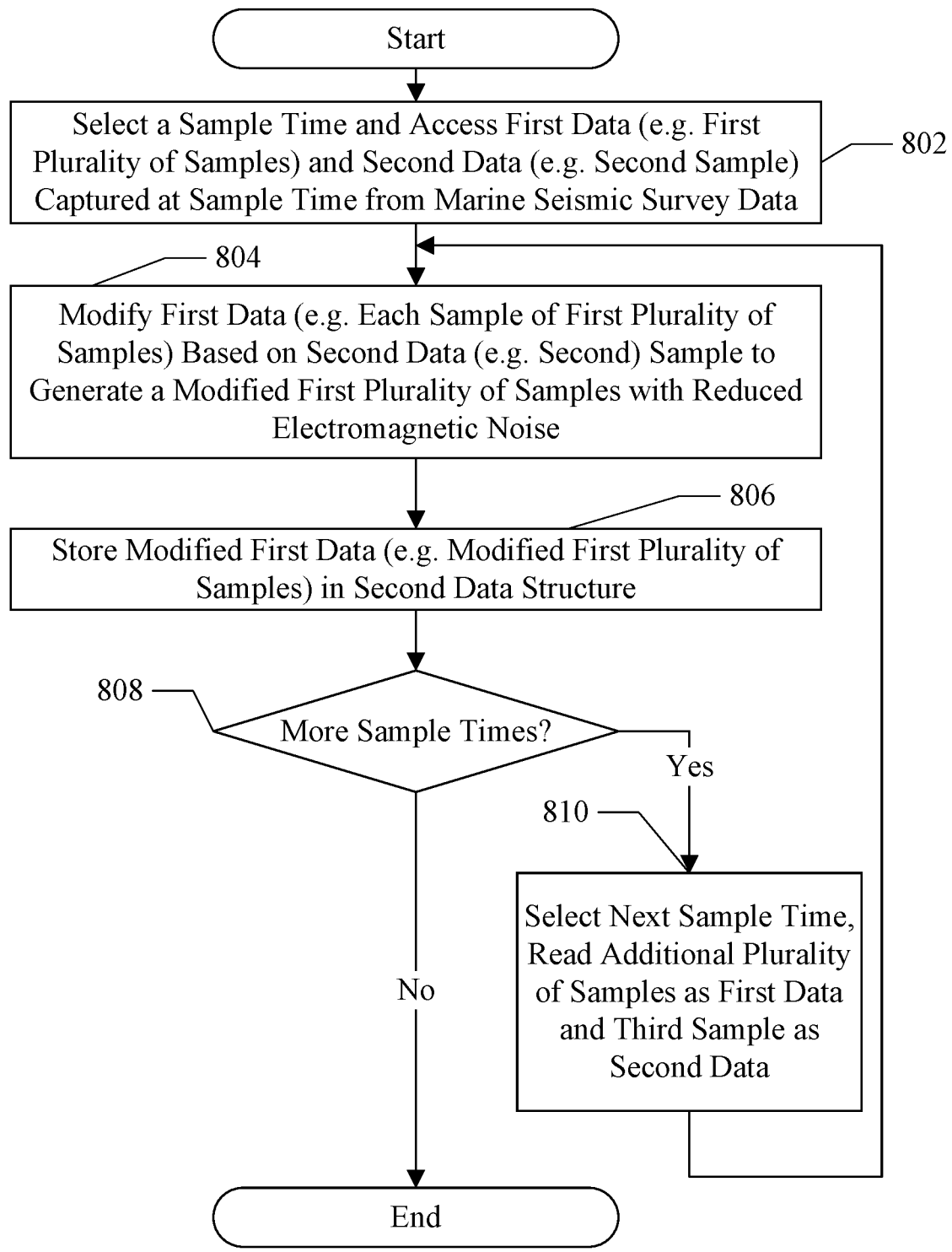
FIG. 8 illustrates one embodiment of a process for removing electromagnetic noise from seismic data.

FIG. 8 illustrates one embodiment of a process for removing the electromagnetic noise from the seismic data. The process of FIG. 8 may be performed as post-processing, e.g. after the seismic survey is completed and the data is downloaded from the recording device to another computer system. Alternatively, the process of FIG. 8 may be performed on the recording system 112, either during the survey or after the survey has been completed. While the blocks are shown in a particular order for ease of understanding, other orders may be used. Blocks may be performed in parallel and/or repeatedly during the process. Blocks, combinations of blocks, and/or the process as a whole may be iterated as desired. In an embodiment, the process of FIG. 8 (or at least a portion thereof) may be implemented as a plurality of instructions executed by a computer system.

The process may include selecting a sample time (e.g. one of times T1 to Tn as shown in FIG. 6). The process may include accessing first data (e.g. a first plurality of samples of seismic data that represents seismic signals captured by a plurality of seismic sensors) and second data (e.g. a second sample of electromagnetic noise data captured by at least one electromagnetic sensor that is insensitive to seismic signals) that was captured at the selected sample time. The accessing may be performed on the geophysical data product 600. That is, the accessing may be performed from one or more data structures of seismic survey data, which may be stored on one or more geophysical data products or in any other data structure in the recording system 112, or in another computer system to which the data from the recording system has been transferred. Alternatively, the accessing may be performed as the samples are received, or in any other desired fashion (block 802).

The process may include modifying the first data (e.g. the first plurality of samples) based on the second data (e.g. the second sample—block 804). Modified first data (e.g. a modified first plurality of samples) may be generated with reduced electromagnetic crosstalk noise effects. The reduction may reduce the electromagnetic noise present in the first modified data to substantially zero, or near zero, depending on how closely the response of the electromagnetic crosstalk sensors match the response of the seismic sensors to the electromagnetic crosstalk noise and further depending on how much the correction of the response may be performed when modifying the first data. Various examples are discussed in more detail below with regard to FIGS. 10-14.

The modified first data (first plurality of samples) may be stored in a second data structure (block 806). For example, the modified first data may be stored as a second geophysical data product. The modified first data may replace the first geophysical data product, or the first geophysical data product (including the raw sample data) may be preserved and the second geophysical data product may be generated.

If there are more sample times in the data to be process (decision block 808, "yes" leg), the process may include selecting the next sample time, and reading additional seismic sample data as the first data (e.g. first plurality of samples of seismic data) and a third sample of the electromagnetic noise samples as the second data (e.g. second sample—block 810). Blocks 804 and 806 may be repeated with the newly-read data. If all the sample times have been processed (decision block 808, "no" leg), the process represented by FIG. 8 is complete.

Figure 9:
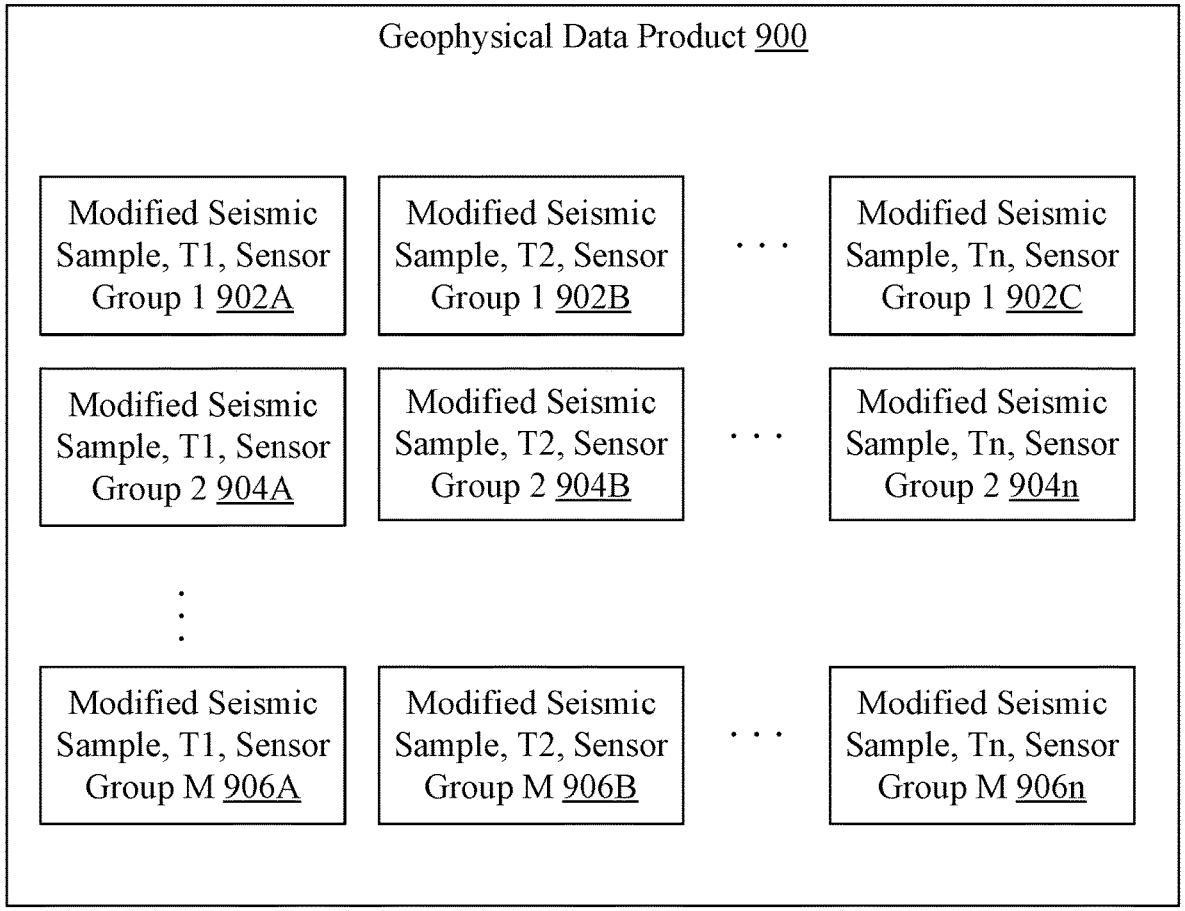
FIG. 9 illustrates another embodiment of a geophysical data product according to some embodiments.

FIG. 9 illustrates a second example geophysical data product 900. Geophysical data product 900 may be similar to geophysical data product 600 in physical construction, but may store the modified seismic samples for each sensor group and sample time (e.g. reference numerals 902A, 902B, to 902$n$ for a first sensor group over sample times T1 to Tn; 904A, 904B, to 904$n$ for a second sensor group over sample times T1 to Tn; and 906A, 906B, to 906$n$ for an Mth sensor group over sample times T1 to Tn).

Figure 10:
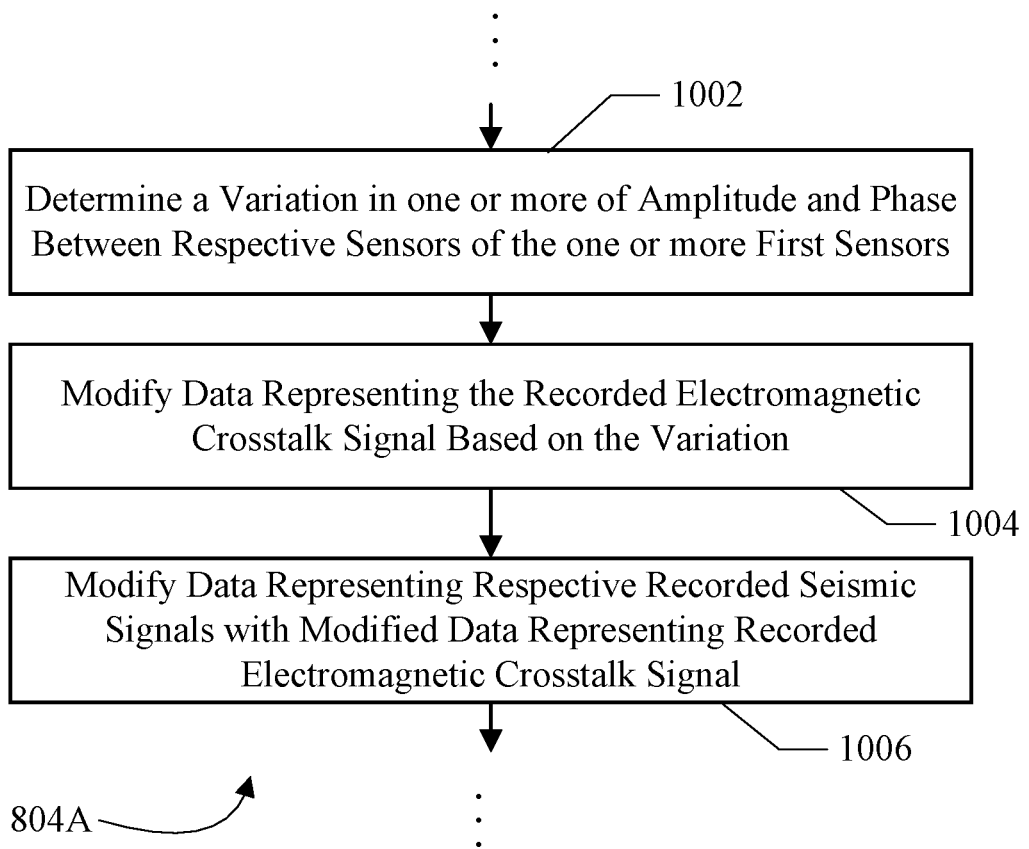
FIG. 10 illustrates a first example embodiment of a portion of the process shown in FIG. 8.

FIG. 10 illustrates one embodiment of block 804 (e.g. block 804A) in greater detail. While the blocks are shown in a particular order for ease of understanding, other orders may be used. Blocks may be performed in parallel and/or repeatedly during the process. Blocks, combinations of blocks, and/or the process as a whole may be iterated as desired. In an embodiment, the process of FIG. 10 (or at least a portion thereof) may be implemented as a plurality of instructions executed by a computer system.

In an embodiment, variations may occur in the response of seismic sensors/sensor groups to the electromagnetic crosstalk noise. For example, the design of the seismic sensors/sensor groups may change over time, but older versions of the seismic sensors/sensor groups may be included in a streamer. Typically, the sensors in a given sensor group may have the same design, but sensors in different sensor groups may differ and/or different sensor groups may differ. Additionally, manufacturing variations can cause different sensors/sensor groups to have different responses. For example, the length of the twisted pair 304 may vary from sensor group to sensor group. The process of FIG. 10 may include determining a variation in the response between respective sensors (e.g. one or more of the amplitude and phase of the response—block 1002). Modification of the first data based on the second data may be further based on the determined variation. For example, the second data (the data representing the recorded electromagnetic crosstalk signal) may be modified based on the variation, to reflect the differences in the response between the different sensors (block 1004). The modified data may be used to modify the samples captured from the different sensors, more accurately modifying each sample to remove the crosstalk (block 1006). For example, the modification may include subtracting the modified second data from the first data. In an embodiment, a representation of the second data may be subtracted (e.g. the second data may be normalized or otherwise modified as described herein).

Figure 11:
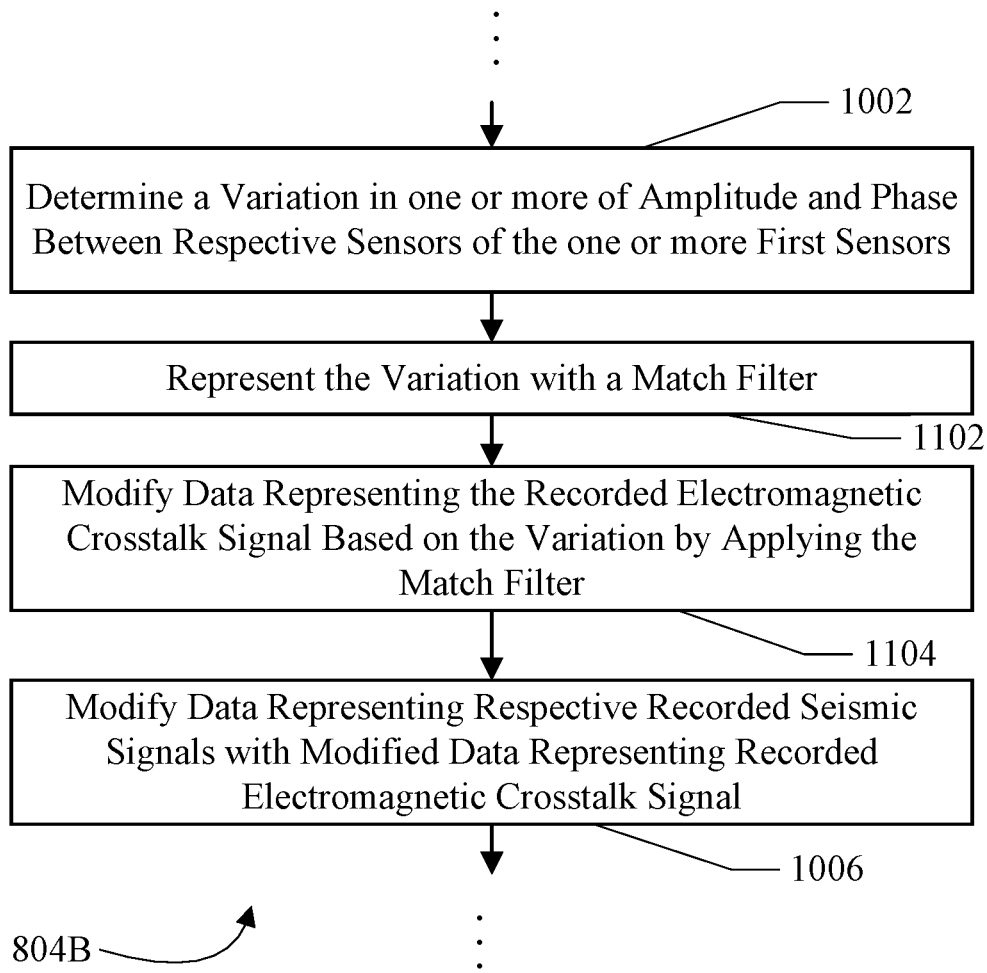
FIG. 11 illustrates a second example embodiment of a portion of the process shown in FIG. 8.

FIG. 11 illustrates another embodiment of block 804 (e.g. block 804B). While the blocks are shown in a particular order for ease of understanding, other orders may be used. Blocks may be performed in parallel and/or repeatedly during the process. Blocks, combinations of blocks, and/or the process as a whole may be iterated as desired. In an embodiment, the process of FIG. 11 (or at least a portion thereof) may be implemented as a plurality of instructions executed by a computer system.

Similar to the block 804A, block 804B may include determining the variation (e.g. one or more of amplitude and phase) between sensors (block 1002). The variation may be represented in a match filter (block 1102). Match filters are generally used when processing seismic data to account for differences in the data from sensor to sensor, and the match filter is applied to the seismic data. In this case, the match filter is programmed with filter parameters that identify differences in electromagnetic response rather than seismic response. Additionally, the match filter may be applied to the electromagnetic crosstalk data captured from the crosstalk recorder, to match the captured noise to the response of the sensor. Thus, modifying the second data (the recorded electromagnetic crosstalk data) may be performed by applying the match filter to the second data (block 1104). The first data (seismic data) may be modified by applying the modified second data (e.g. via subtraction of the modified second data from the first data, block 1006).

Figure 12:
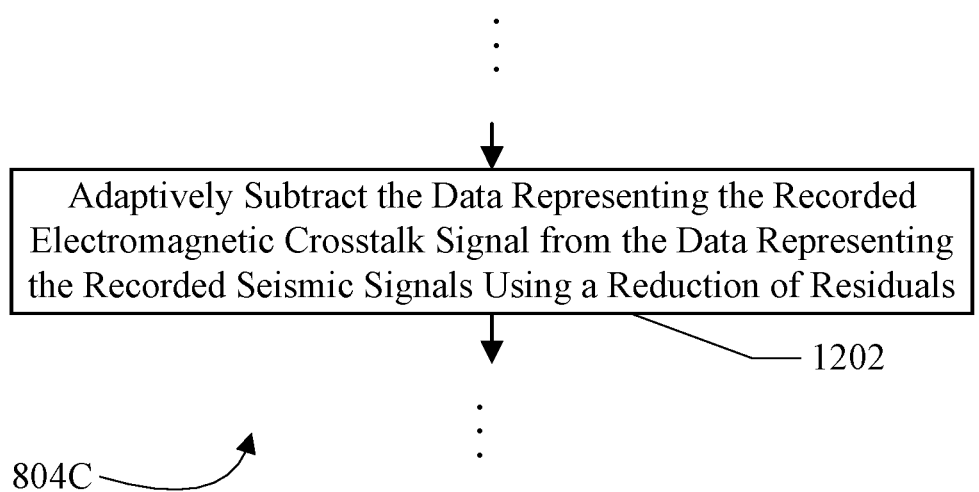
FIG. 12 illustrates a third example embodiment of a portion of the process shown in FIG. 8.

FIG. 12 illustrates another embodiment of block 804 (e.g. block 804C). In an embodiment, the process of FIG. 12 (or at least a portion thereof) may be implemented as a plurality of instructions executed by a computer system. In the embodiment of FIG. 12, the data representing the electromagnetic crosstalk signal (e.g. the second data) may be adaptively subtracted from the data represented the seismic signals (e.g. first data). Various reduction of residuals mechanisms may be used in the adaptive subtraction, such as a least squares mechanism (block 1202).

Figure 13:
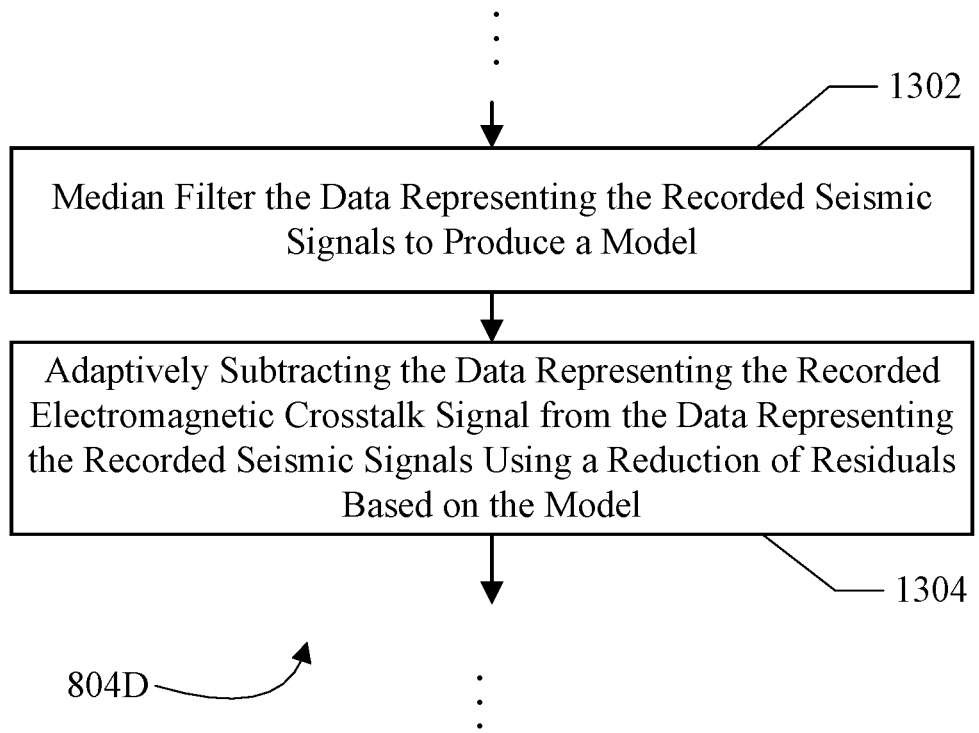
FIG. 13 illustrates a fourth example embodiment of a portion of the process shown in FIG. 8.

FIG. 13 illustrates another embodiment of block 804 (e.g. block 804D). While the blocks are shown in a particular order for ease of understanding, other orders may be used. Blocks may be performed in parallel and/or repeatedly during the process. Blocks, combinations of blocks, and/or the process as a whole may be iterated as desired. In an embodiment, the process of FIG. 13 (or at least a portion thereof) may be implemented as a plurality of instructions executed by a computer system.

The embodiment of FIG. 13 may employ median filtering on the first data (seismic data) to produce a model (block 1302). The second data (electromagnetic crosstalk signal data) may be adaptively subtracted from the first data using a reduction of residuals based on the median filter model (block 1304). Median filtering may be a non-linear digital filtering technique is which samples are replaced by the median of neighboring samples in the data. The size of the window from which median samples are determined may vary from implementation to implementation.

Figure 14:
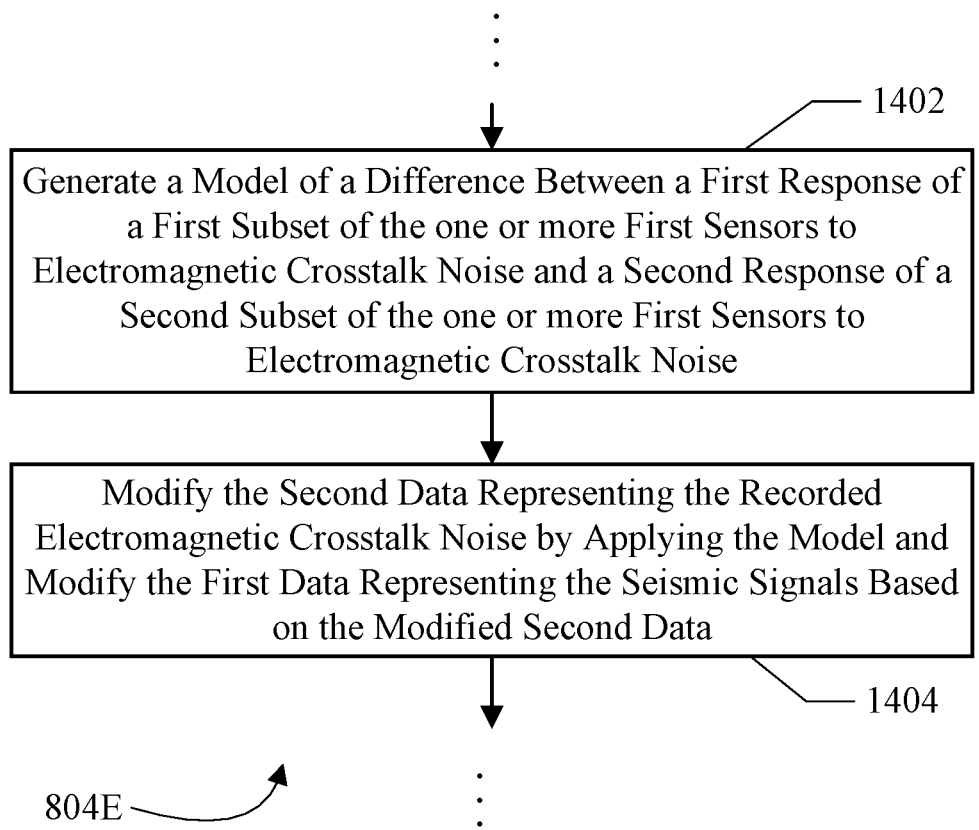
FIG. 14 illustrates a fifth example embodiment of a portion of the process shown in FIG. 8.

FIG. 14 is still another embodiment of block 804 (e.g. block 804E). While the blocks are shown in a particular order for ease of understanding, other orders may be used. Blocks may be performed in parallel and/or repeatedly during the process. Blocks, combinations of blocks, and/or the process as a whole may be iterated as desired. In an embodiment, the process of FIG. 14 (or at least a portion thereof) may be implemented as a plurality of instructions executed by a computer system.

In FIG. 14, a model may be generated by dividing the sensors into subsets based on the similarity of their response to electromagnetic crosstalk noise. The response of each subset may be characterized, and differences may be expressed in the model (e.g. via an equation or equations that are fit to the characterization, e.g. using various reductions of residuals—block 1402). The data representing the electromagnetic crosstalk noise may be modified by applying the model to the data, and then the data may be subtracted from the data representing the seismic signals (block 1404).

It is noted that, while various embodiments above have described modifying the second data (representing the electromagnetic crosstalk signal/noise) and them modifying the first data using the modified second data, other embodiments may modify the first data and subtract the second data, or may modify both sets of data and subtracting the modified second data from the modified first data. Still other embodiments may modify the result of subtracting the second data from the first data.

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 15:
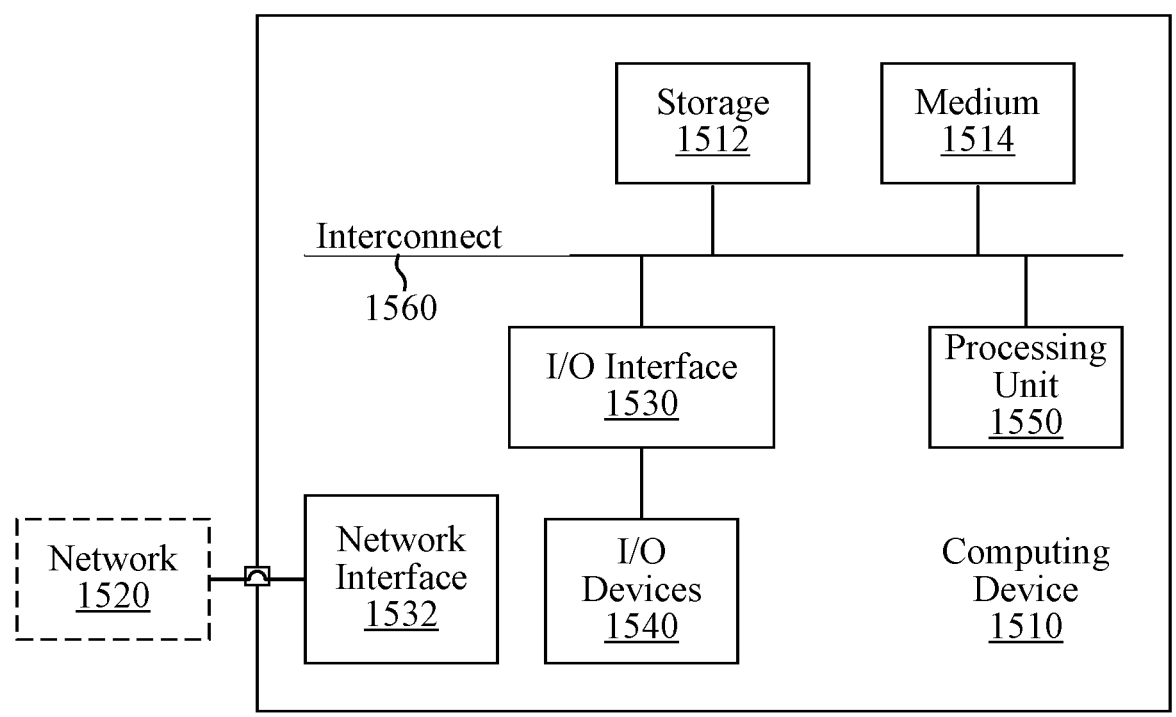
FIG. 15 illustrates one embodiment of a computing device.

Turning now to FIG. 15, a block diagram of a computing device (which may also be referred to as a computing system or computer system) is depicted, according to some embodiments. Computing device 1510 may be used to implement various portions of this disclosure. Computing device 1510 is one example of a device that may be used as a mobile device, a server computing system, a client computing system, or any other computing system implementing portions of this disclosure.

Computing device 1510 may be any suitable type of device, including, but not limited to, a personal computer system, desktop computer, laptop or notebook computer, mobile phone, mainframe computer system, web server, workstation, or network computer. As shown, computing device 1510 includes processing unit 1550, storage subsystem 1512, and input/output (I/O) interface 1530 coupled via interconnect 1560 (e.g., a system bus). I/O interface 1530 may be coupled to one or more I/O devices 1540. Computing device 1510 further includes network interface 1532, which may be coupled to network 1520 for communications with, for example, other computing devices.

As described above, processing unit 1550 includes one or more processors. In some embodiments, processing unit 1550 includes one or more coprocessor units. In some embodiments, multiple instances of processing unit 1550 may be coupled to interconnect 1560. Processing unit 1550 (or each processor within processing unit 1550) may contain a cache or other form of on-board memory. In some embodiments, processing unit 1550 may be implemented as a general-purpose processing unit, and in other embodiments it may be implemented as a special purpose processing unit (e.g., an ASIC). In general, computing device 1510 is not limited to any particular type of processing unit or processor subsystem.

Storage subsystem 1512 is usable by processing unit 1550 (e.g., to store instructions executable by and data used by processing unit 1550). Storage subsystem 1512 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1512 may consist solely of volatile memory in some embodiments. Storage subsystem 1512 may store program instructions executable by computing device 1510 using processing unit 1550, including program instructions executable to cause computing device 1510 to implement the various techniques disclosed herein. In at least some embodiments, storage subsystem 1512 may represent an example of a non-transitory computer-readable medium that may store executable instructions. For example, the instructions, when executed, may cause the computing device 1510 to perform operations as described herein, including instructions which implement operations illustrated in one or more of FIGS. 7, 8, and 10-14.

In the illustrated embodiment, computing device 1510 further includes non-transitory medium 1514 as a possibly distinct element from storage subsystem 1512. For example, non-transitory medium 1514 may include persistent, tangible storage such as disk, nonvolatile memory, tape, optical media, holographic media, or other suitable types of storage. In some embodiments, non-transitory medium 1514 may be employed to store and transfer geophysical data, and may be physically separable from computing device 1510 to facilitate transport. Accordingly, in some embodiments, the non-transitory medium 1514 may constitute the geophysical data product discussed above. Although shown to be distinct from storage subsystem 1512, in some embodiments, non-transitory medium 1514 may be integrated within storage subsystem 1512. The non-transitory medium 1514 may also be an example of a medium which may store instructions which, when executed, cause the computing device 1510 to perform operations as described herein, including instructions which implement operations illustrated in one or more of FIGS. 7, 8, and 10-14.

I/O interface 1530 may represent one or more interfaces and may be any of various types of interfaces configured to couple to and communicate with other devices, according to various embodiments. In some embodiments, I/O interface 1530 is a bridge chip from a front-side to one or more back-side buses. I/O interface 1530 may be coupled to one or more I/O devices 1540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1540.

Numerous variations and modifications will become apparent to those skilled in the art once the above disclosure is fully appreciated. It is intended that the following claims be interpreted to embrace all such variations and modifications.

What is claimed is:

1. A seismic data collection apparatus comprising:
one or more first sensors configured to output first data representing a seismic signal, wherein the seismic signal represents acoustic energy detected by the one or more first sensors, wherein the one or more first sensors are susceptible to electromagnetic crosstalk noise, and wherein the electromagnetic crosstalk noise does not represent the acoustic energy detected by the one or more first sensors, such that the first data contain both information that corresponds to the acoustic energy and information that corresponds to the electromagnetic crosstalk noise; and one or more second sensors configured to output second data representing the electromagnetic crosstalk noise, wherein the one or more second sensors are not responsive to the seismic signal, such that the second data contain information that corresponds to the electromagnetic crosstalk noise but not information that corresponds to the acoustic energy.

2. The apparatus of claim 1, further comprising:
a computer system configured to record samples from the one or more first sensors and the one or more second sensors.

3. The apparatus of claim 1, wherein the apparatus is a marine seismic streamer.

4. The apparatus of claim 1, wherein the apparatus is an ocean-bottom cable.

5. The apparatus of claim 1, wherein the apparatus is an ocean-bottom node.

6. The apparatus of claim 1, wherein the one or more first sensors and the one or more second sensors have substantially the same response to the electromagnetic crosstalk noise.

7. The apparatus of claim 1, wherein each of the one or more second sensors comprises a first plurality of electrical conductors having a length that is matched to a length of electrical conductors in a second plurality of electrical conductors in each of the one or more first sensors.

8. The apparatus of claim 1, wherein each of the one or more second sensors comprises at least one antenna.

9. The apparatus of claim 8, wherein the at least one antenna comprises one or more capacitors and a twisted pair of electrical conductors coupled to the one or more capacitors.

10. The apparatus of claim 9, wherein the one or more capacitors are cylindrical capacitors.

11. The apparatus of claim 1, wherein the one or more first sensors and the one or more second sensors are enclosed in a device configured to be deployed in a marine environment.

12. The apparatus of claim 11, wherein the device comprises a streamer configured to be towed in a body of water.

13. The apparatus of claim 12, wherein the streamer has a plurality of sections, and the one or more first sensors are included in a first section of the plurality of sections, and at least one of the one or more second sensors are included in the first section.

14. The apparatus of claim 12, wherein the streamer has a plurality of sections, and the one or more first sensors are included in a first section of the plurality of sections, and the one or more second sensors are included in a second section of the plurality of sections.

15. The apparatus of claim 12, wherein the one or more second sensors are coupled to an end of the streamer that is nearest a vessel that tows the streamer.

16. The apparatus of claim 15, wherein the one or more second sensors are located on the vessel.

17. An apparatus, comprising:
first means for detecting electromagnetic crosstalk noise;
second means for detecting seismic signals, wherein the second means is susceptible to the electromagnetic crosstalk noise; and
third means for digitizing the electromagnetic crosstalk noise and the seismic signals;
wherein the seismic signals represent acoustic energy;
wherein the electromagnetic crosstalk noise does not represent the acoustic energy;
wherein the first means is not responsive to the acoustic energy, such that the first means produces an output containing information that corresponds to the electromagnetic crosstalk noise but not information that corresponds to the acoustic energy; and
wherein the second means produces an output containing both information that corresponds to the acoustic energy and information that corresponds to the electromagnetic crosstalk noise.

* * * * *